United States Patent

Brauns et al.

Patent Number: 5,950,782
Date of Patent: Sep. 14, 1999

[54] ARRANGEMENT AND METHOD FOR LOCKING A SELECTOR MECHANISM OF AN AUTOMATICALLY OPERATING CHANGE-SPEED GEARBOX

[75] Inventors: Andreas Brauns; Marek Milewski; Guenter Kretzmer, all of Hamburg; Klaus-Peter Hansen, Lueneburg; Rouven Westphal, Hamburg, all of Germany

[73] Assignee: DaimlerChrysler AG, Germany

[21] Appl. No.: 08/948,419

[22] Filed: Oct. 10, 1997

[30] Foreign Application Priority Data

Oct. 10, 1996 [DE] Germany ............................ 196 41 706

[51] Int. Cl.$^6$ ............................ B60K 41/26; B60K 41/22
[52] U.S. Cl. ............................................ 192/3.63; 74/475
[58] Field of Search ................................ 192/3.63, 220.3, 192/220.4; 74/473.16, 473.18

[56] References Cited

U.S. PATENT DOCUMENTS

| 4,936,158 | 6/1990 | Livshits et al. ............ 74/473.23 |
| 5,080,208 | 1/1992 | Sakuma et al. ............ 192/4 A |
| 5,759,132 | 6/1998 | Osborn et al. ............ 192/220.4 |

FOREIGN PATENT DOCUMENTS

| 0 307 846 | 3/1989 | European Pat. Off. . |
| 41 18 519 A1 | of 0000 | Germany . |
| 3-239868 | of 0000 | Japan . |
| 6-117526 | of 0000 | Japan . |
| 2 287 076 | 9/1995 | United Kingdom . |

Primary Examiner—Charles A. Marmor
Assistant Examiner—Tisha D. Waddell
Attorney, Agent, or Firm—Evenson, McKeown, Edwards & Lenahan, P.L.L.C.

[57] ABSTRACT

An arrangement for locking a selector mechanism can be moved by a manual selector element, into, among others, positions P and R and is usable for an automatically operating change-speed gearbox. A servomotor can be moved by auxiliary force into one end position, in which locking dogs for locking the manual selector element in the P-position are disengaged, and by spring force into its other end position, in which locking dogs for blocking the movement of the manual selector element into the R-position are disengaged.

7 Claims, 3 Drawing Sheets

ARRANGEMENT AND METHOD FOR LOCKING A SELECTOR MECHANISM OF AN AUTOMATICALLY OPERATING CHANGE-SPEED GEARBOX

This application claims the priority of German application 196 41 706.6, the disclosure of which is expressly incorporated by reference herein.

The present invention relates to an arrangement for locking a selector mechanism of an automatically operating change-speed gearbox, and more particularly, to an arrangement which by means of a manual selector element connected to a locking gate in a motionally dependent manner, can be moved into positions P for the engagement of a parking brake, R for the engagement of a reverse gear, N for the interruption of the torque transmission and D for the activation of a shift program for forward travel. A locking actuator interacts with the locking gate for locking the manual selector element in the P-position and for blocking the actuated movement of the manual selector element into the R-position. The actuator can be changed over between two end positions by a servomotor in interaction with a resilient restoring device. A locking dog fixed in place relative to the locking gate, and a locking dog fixed in place relative to the locking actuator are allocated to the P-position and come into mutual engagement for blocking the movement of the manual selector element in the actuating direction from the P-position to the D-position if the locking gate is in the region of its position corresponding to the P-position and the locking actuator is in the region of the end position actuated by the restoring device. A locking dog fixed in place relative to the locking gate and a locking dog fixed in place relative to the locking actuator are allocated to the R-position and come into mutual engagement for blocking the movement of the manual selector element in the actuating direction from the D-position to the P-position if the locking gate is displaced, in the direction of its position corresponding to the R-position, beyond its position corresponding to the N-position and when the locking actuator is in the region of one of its end positions.

In the known arrangement shown in JP-A 239868/1991, both the locking dogs allocated to the P-position and the locking protrusions allocated to the R-position are disengaged by excitation of an electromagnet for releasing the respective lock. The respective locking function is therefore maintained by spring force, so that the selector mechanism cannot be put into the P-position in the event of a power failure in the overall system of the vehicle.

In the known arrangement for locking a selector mechanism shown in JP 6-117526 A, the manual selector lever is connected in a fixed manner to a locking gate which is provided with a number and sequence of locking dogs corresponding in each case to the positions of the manual selector lever. A locking lever which can be moved between a locking end position and a release end position by an electromagnet comes into engagement, upon being moved into its locking end position, with the locking dog of the respective position of the manual selector lever if a travel-speed threshold value allocated to this position is reached or has been reached.

Further, a downshift lock for an automatically operating change-speed gearbox, in particular an automatic change-speed gearbox for motor vehicles, is described in DE 41 18 519 to prevent manual downshift from a higher gear to a lower gear if this were to result in a critical travel state. In this downshift lock a selector lever is provided is pivotally mounted relative to a selector-lever housing and, by pivoting about its pivot axis, can be shifted, in one direction, from a neutral shift position N to a normal-travel shift position D and beyond the latter to one or more low-gear shift positions 1, 2 and, in the other direction, to a reverse-gear shift position R and, beyond that, to a parking shift position P. In this known downshift lock, the aim is to permit shifting of the selector lever in the direction of a lower gear only when the driven speed also enables the shift command thus given to be realized, although it is possible to select the neutral position from any selector-lever position, under all operating conditions.

Furthermore, this known downshift lock is also intended to perform the function of a so-called brake lock, i.e. protection against unintentional moving of the vehicle by shifting the selector lever into a travel position from the parking position, so that additional expenditure for such a function is not necessary. For this purpose, provision is made, in the case of the known downshift lock, for the selector lever to be retained in its pivot position relative to the selector-lever housing by a ratchet locking mechanism consisting of a ratchet having a plurality of ratchet catches and a ratchet rod. Thereby, the movement of the selector lever from the parking shift position P to the reverse-gear shift position R, as well as from the normal-travel shift position D to a low-gear shift position 1, 2, and from each low-gear shift position 2 to a further, lower low-gear shift position 1, is locked by the ratchet locking mechanism.

In the opposite direction of movement, the known selector lever is released in its movement by the ratchet, in the course of which the ratchet catches of the ratchet, by way of a solenoid actuated by an electronic control unit, can be disengaged from the ratchet rod against the force of a spring, under one of the following conditions:

(a) Selector lever set in parking shift position P—ignition switched on, brake actuated;
(b) Selector lever set in normal-travel shift position D or in a low-gear shift position;
a gear-specific rotational-speed-sensor signal concerning an appropriate rotational speed at which safe downshift is permitted.

In this known downshift lock, the ratchet, with its ratchet catches lifted in an inoperative position from the ratchet rod and from the solenoid, can be brought into engagement with the ratchet rod against the force of a spring, under one of the following conditions:

(a) Selector lever set in parking shift position P, brake not actuated;
(b) Selector lever set in normal shift position D or in a low-gear shift position; a gear-specific rotational-speed-sensor signal which signals a rotational speed which is too high for safe downshift.

An object of the invention essentially involves providing an arrangement for locking a selector mechanism in such a way that the vehicle can be safely parked after a power failure in the overall system.

The foregoing object has been advantageously achieved according to the present invention by providing the locking dog allocated to the R-position and fixed in place relative to the locking gate and the locking dog allocated to the P-position and fixed in place relative to the locking gate are offset from one another by an amount corresponding to the distance between the end positions of the locking actuator, and it is only in the end position of the locking actuator, which end position is actuated by auxiliary force of the servomotor that the locking dog comes into mutual engagement with the locking dog allocated to the R-position and fixed in place relative to the locking actuator.

In the arrangement for locking a selector mechanism according to the present invention, the locking dogs allocated to the R-position are maintained in the disengage position by spring force, so that the selector mechanism can be moved into the P-position after a power failure and thus the vehicle can be safely parked.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
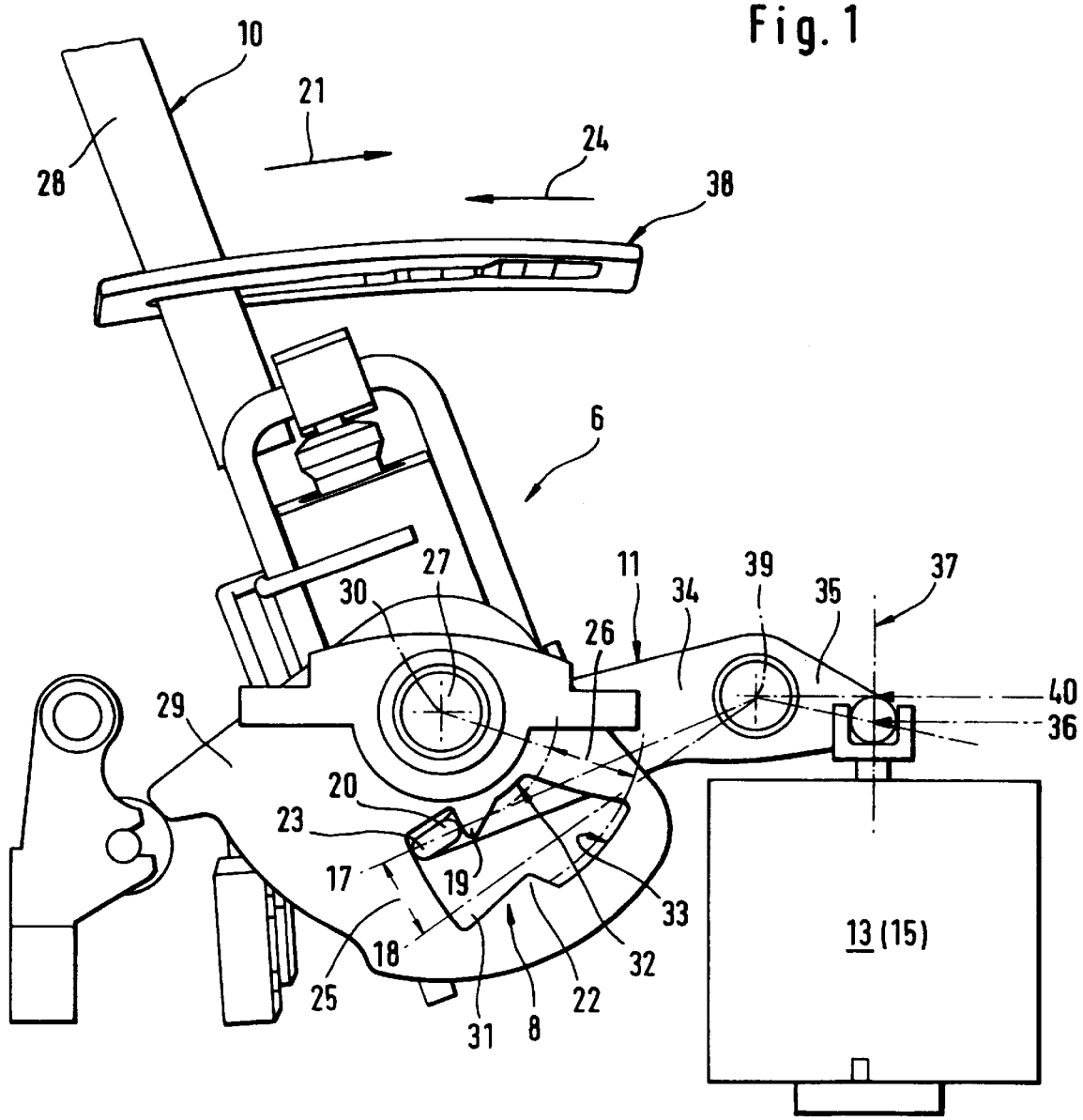
FIG. 1 is a side elevational view of the first embodiment of an arrangement for locking a selector mechanism of an automatically operating change-speed gearbox according to the present invention.

A selector shaft 27 oriented with its rotation axis 30 transverse to the longitudinal direction of the motor vehicle is rotatably mounted in a housing of a selector mechanism 6 as seen in FIG. 1. The shaft 27 has both a manual selector element 10 in the form of a manual selector lever 28, and a gate plate 29 fixedly connected thereto. The manual selector lever 28, guided by a selector gate 38, can be moved from the illustrated P-position for the engagement of a parking brake, via an R-position for the engagement of a reverse gear. The lever 28 can continue in the actuating direction as indicated by arrow 21, via an N-position for the interruption of the torque transmission, into a D-position for the activation of a shift program for forward travel.

The gate plate 29 is provided with a locking gate 8 in the form of a gate slot 31 which extends approximately in the peripheral direction relative to the rotation axis 30 and whose two radially opposite slot walls 32, 33 are each provided with a respective locking dog 19, 22. The locking dog 19 located on the radially inner slot wall 32, which is the top slot wall in the installation position, is allocated to the P-position, and the other locking dog 22 is allocated to the R-position.

A dog arrangement 20—20 engages in the gate slot 31 and is fixedly arranged on a lever arm 34 of a differential lever 11 used as locking actuator. The lever 11 is, in turn, mounted to be rotated, relative to the housing, about a rotation axis 39 parallel to the rotation axis 30. The other lever arm 35 of the differential lever 11 is operatively connected to a servomotor in the form of a solenoid 13 with an integrated restoring spring which by way of the integrated restoring spring 15 which moves the lever arm 35 into its illustrated retracted stroke end (or inoperative) position 36, and, in the installation position, is arranged vertically in relation to its stroke axis 37.

In the end position 36, actuated by the restoring spring 15, the differential lever 11 is forced into an illustrated rotary-angle end position 17, in which a locking dog 20, allocated to the P-position, of the dog arrangement 20–23 engages the locking dog 19 of the locking gate 8 if the manual selector lever 28 is displaced from the P-position in the direction of the D-position., i.e., in the actuating direction 21.

In the rotary-angle end position 17 of the differential lever 11, the locking dog 22, allocated to the R-position, of the locking gate 8 and a locking dog 23, allocated to the R-position, of the dog arrangement 20–23 are disengaged. The locking dog 22, allocated to the R-position, of the locking gate 8 is arranged with a larger radius relative to the rotation axis 30 compared with the locking dog 19, allocated to the P-position, of the locking gate 8. The relevant radius difference 26 is matched to a rotary-angle distance 25 which separates the rotary-angle end position 17 from a further rotary-angle end position 18 of the differential lever 11, into which the differential lever 11 is moved when the solenoid 13 is excited or activated to extend into its other stroke end position 40.

The locking dogs 22, 23 allocated to the R-position come into mutual engagement if the manual selector lever 28, disposed in the N- or D-position, is displaced in the actuating direction 24, in the direction of the R-position, beyond the N-position.

Due to the vertical arrangement of the solenoid 13 in combination with the locking dog 19 allocated to the P-position being arranged at the top, the weight of the solenoid armature assists the action of the resilient restoring spring 15 with regard to a stable state of the lock arrangement in the P-position as well as with regard to the unlocked state of the locking dogs 22, 23 for the R-position.

Figure 3:
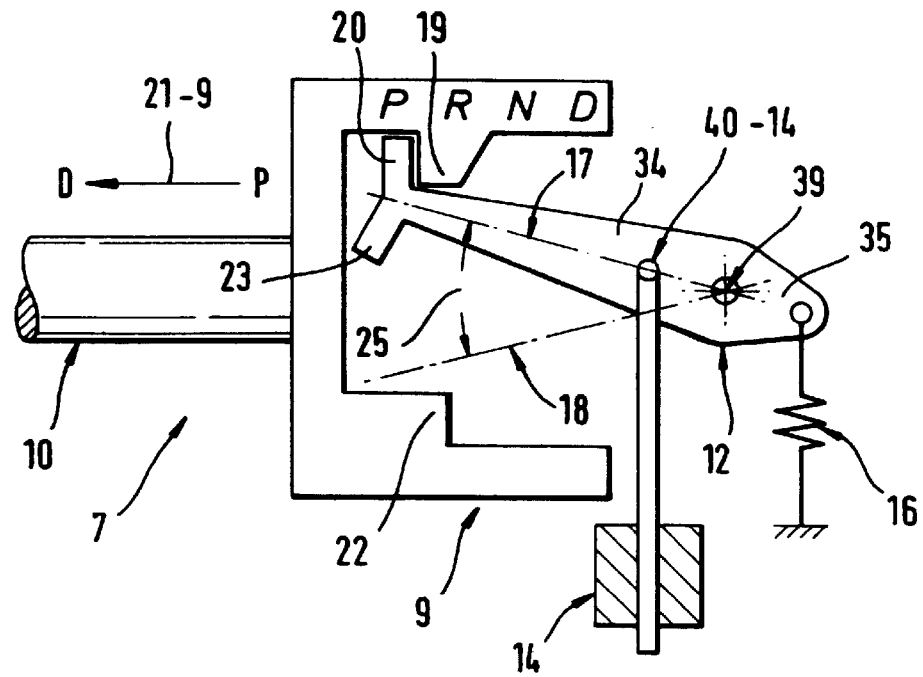
FIG. 3 is a side elevational view of the second embodiment of an arrangement for locking a selector mechanism of an automatically operating change-speed gearbox according to the present invention, this arrangement being shown in a first locking state.
Figure 4:
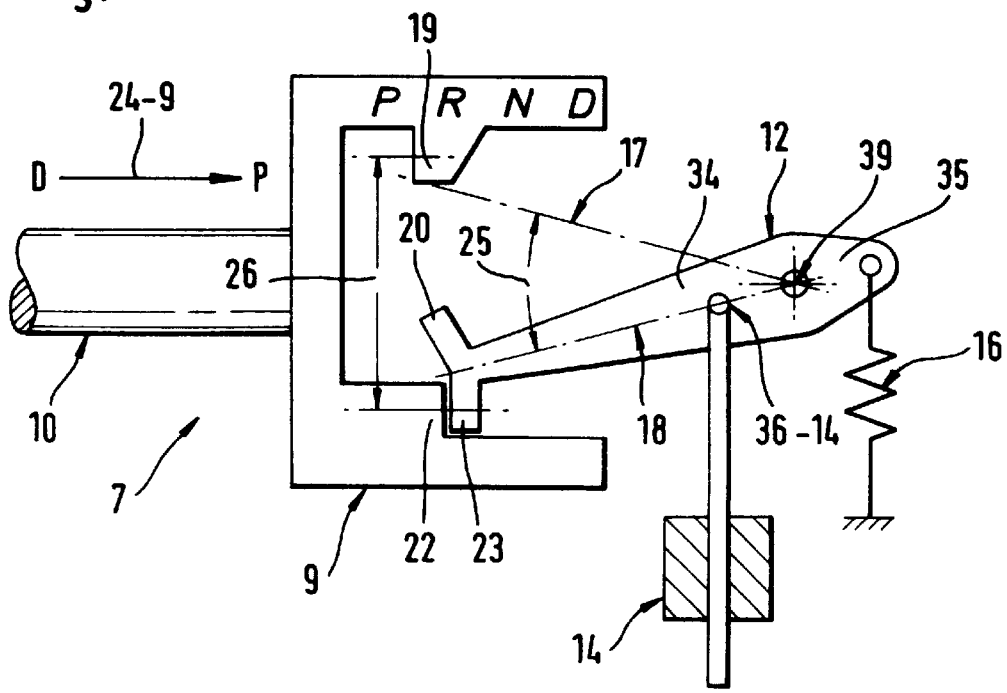
FIG. 4 is a view similar to FIG. 3 but showing the arrangement in a second locking state.

In the second embodiment of the arrangement according to the present invention shown in FIGS. 3 and 4, a linearly movable manual selector element 10 can be displaced, relative to the fixed rotation axis 39 of a differential lever 12 used as locking actuator, from the P-position, which is depicted in FIG. 3, in the direction of the D-position, in the actuating direction 21–9, as well as from the D-position in the direction of the P-position, in the actuating direction 24–9.

The manual selector element 10 belongs to a selector mechanism 7 which also includes a U-shaped locking gate 9. The differential lever 12 and a servomotor in the form of a solenoid 14 with a restoring spring 16.

The locking gate 9 connected to the manual selector element 10 in a motionally dependent manner has, on one leg, a locking dog 19 allocated to the P-position depicted (FIG. 3) and, on its other leg, a locking dog 22 allocated to the R-position.

The lever arm 34 of the differential lever 12 is operatively connected to the solenoid 14, and has a dog arrangement 20–23 at its free lever end, whereas the restoring spring 16 acts on the other lever arm 35. The restoring spring 16 moves the differential lever 12 into a rotary-angle end position 17, in which the locking dog 19 of the locking gate 9 comes into engagement with a locking dog 20, allocated to the P-position, of the dog arrangement 20–23 if the manual selector element 10 is displaced from the P-position in the actuating direction 21–9 and the differential lever 12 is in the region of its rotary-angle end position 17. In the rotary-angle end position 17 of the differential lever 12, the solenoid 14 assumes its extended stroke end position 40–14 (inoperative position).

The locking dog 22, allocated to the R-position, of the locking gate 9 is at a distance 26 from the locking dog 19 allocated to the P-position, which distance 26 is matched to a rotary-angle distance 25 which separates the rotary-angle end position 17 from a rotary-angle end position 18 of the differential lever 12, into which the latter can be moved by excitation of the solenoid 14. In the course of such movement, the solenoid 14 moves into its retracted stroke end position 36–14 shown in FIG. 4.

The locking dog 22 of the locking gate 9 comes into engagement with a locking dog 23, allocated to the R-position, of the dog arrangement 20–23 if the manual selector element 10 is in the D-position or in the N-position, which is depicted in FIG. 4, and the differential lever 12 is in the region of its rotary-angle end position 18, and if the manual selector element 10 is displaced beyond the N-position in the actuating direction 24–9.

Figure 2:
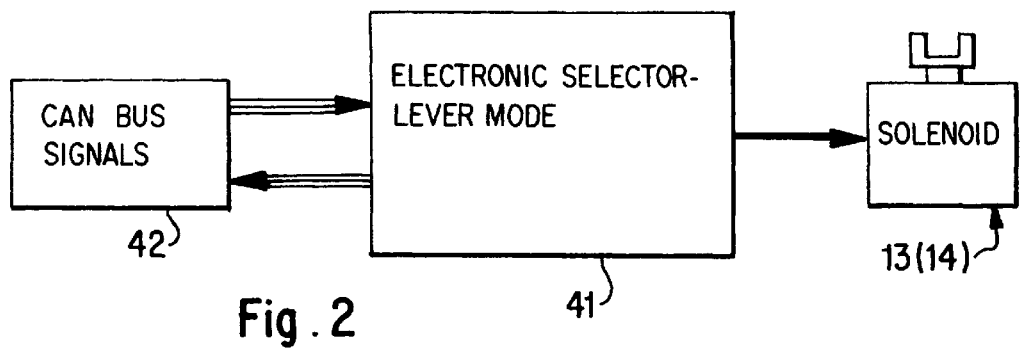
FIG. 2 is a block diagram of the control apparatus of the servomotor of the arrangement according to the present invention, for the embodiments of FIG. 1 and hereinafter described FIG. 3.
Figure 5:
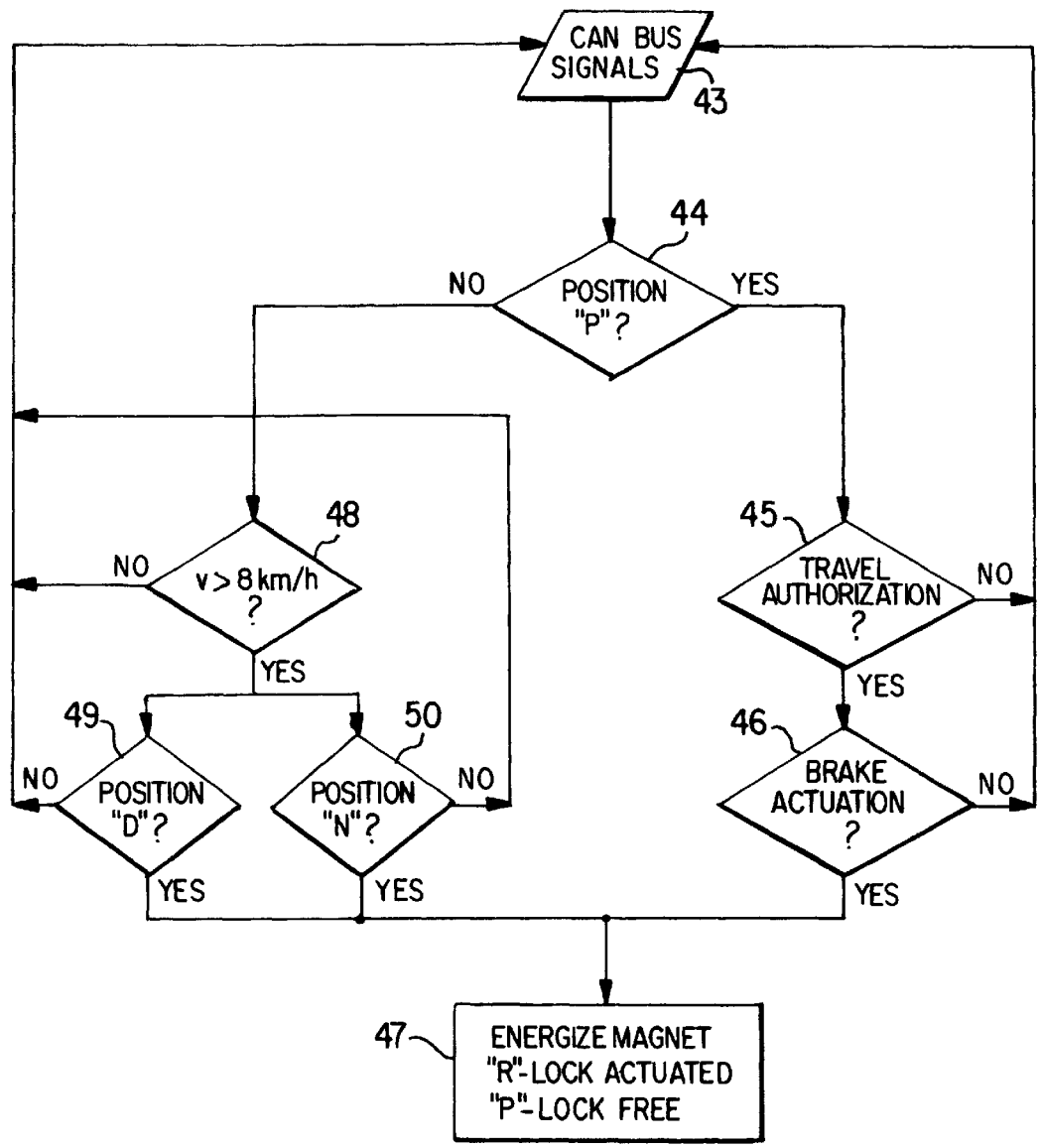
FIG. 5 is a signal flow diagram of the control apparatus of FIG. 2.

The respective solenoid 13 or 14 of the two embodiments of FIG. 1, on one hand, and of FIGS. 3 and 4, on the other hand, is controlled according to FIG. 2 by an electronic control unit 41 which communicates with a CAN bus 42 and processes signals concerning the position of the manual selector element 10, the rotational speed of the output shaft of the change-speed gearbox, travel authorization specific to the vehicle driver, and a vehicle brake. In a constant cycle after initiating a starting condition 43 as seen in FIG. 5, a check is made, in a first step 44, to determine whether the manual selector element 10 is in the P-position. If so, a check is made, in a second step 45, to determine whether travel authorization is given. If not, the signal returns, via the starting step 43, to the step 44 relating to the checking of the P-position. If travel authorization is recognized as having been given in the second step 45, a check is made in a third step 46, to determine whether a brake pedal has been actuated. If not, the signal returns, via the starting stage or step 43, to the first step 44 for checking the P-position. If actuation of the brake pedal is recognized in the third step 46, changeover of the solenoid 13 or 14 into the region of its stroke end position 40 or 36–14, respectively, is effected in a fourth step 47, so that the locking dogs 19, 20 allocated to the P-position are disengaged.

In the event of the manual selector element 10 not being in the P-position during the check in the first step 44, a check is made in a fifth step 48 to determine whether the current travel speed>8 km/h. If not, the signal returns via, the starting stage 43, to the first step for checking the P-position. If a current travel speed exceeding 8 km/h is recognized in the fifth step 48, a check is made, in synchronous steps 49 and 50, to determine whether the manual selector element 10 is in the D-position or the N-position. If so, the signal is passed to the fourth step 47 and the solenoid 13 or 14 is excited and the respective locking actuator 11 or 12 is thereby moved into its rotary-angle end position 18. Thereby, the locking dogs 22, 23 come into engagement if the manual selector element 10 is moved for the engagement of the reverse gear R.

In the event of a check in the steps 49 and 50 showing that the manual selector element 10 is in neither the D-position nor the N-position, the signal returns, via the starting stage 43, to the first step 44 for checking the P-position.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for locking a selector mechanism which is used for an automatically operating change-speed gearbox, comprising a locking gate; a manual selector element operatively connected to the locking gate in a motionally dependent manner, to be movable into a P-position for engagement of a parking brake, an R-position for engagement of a reverse gear, an N-position for interruption of engine torque transmission and a D-position for activation of a shift program for forward travel; a locking actuator configured to interact with the locking gate for locking the manual selector element in the P-position and for blocking actuated movement of the manual selector element into the R-position and to be changeable over between two end positions by a servomotor interacting with a resilient restoring device; a first locking dog fixed relative to the locking gate and a second locking dog fixed relative to the locking actuator allocated to the P-position, the first and second locking dogs being arranged to mutually engage for blocking movement of the manual sector element in the actuating direction from the P-position to the D-position when the locking gate is in a positional region corresponding to the P-position and the locking actuator is in an end position region actuated by the restoring device, and a third locking dog fixed relative to the locking gate and a fourth locking dog fixed relative to the locking actuator allocated to the R-position, the third and fourth locking dogs being arranged to mutually engage for blocking the movement of the manual selector element in the actuating direction from the D-position to the P-position when the locking gate is displaced in a direction corresponding to the R-position beyond a position thereof corresponding to the N-position and the locking actuator is in an end position region, wherein the third locking dog is allocated to the R-position and fixed relative to the locking gate and the first locking dog allocated to the P-position and fixed relative to the locking gate are offset by an amount corresponding to a distance between end positions of the locking actuator, and only in the end position of the locking actuator which is actuated by auxiliary force of the servomotor is the first locking dog operable to mutually engage the fourth locking dog allocated to the R-position whereby the selector mechanism is arranged so as to be moveable into the P-position even after a power interruption to the automatically operated change-speed gearbox.

2. The arrangement according to claim 1, wherein the selector element comprises a manual selector lever and a gate plate are fixedly connected to a rotatably mounted selector shaft, and the gate plate has a gate slot extending approximately in a peripheral direction relative to a rotation axis of the selector shaft and has two radially opposed walls, one of which is operatively associated with one of the two locking dogs.

3. The arrangement according to claim 2, wherein the locking actuator comprises a locking lever operably mounted to pivot relative to a housing and provided with the second and fourth locking dogs, of which one locking dog is arranged to be brought into engagement with the first locking dog allocated to the P-position, of the gate slot and the other locking dog is configured to be brought into engagement with the third locking dog allocated to the R-position, of the gate slot.

4. The arrangement according to claim 2, wherein the first locking dog allocated to the P-position and fixed relative to the locking gate is provided on one of the opposed wall of the gate slot, which wall is a top slot wall in the installation position.

5. The arrangement according to claim 3, wherein the locking actuator comprises a differential lever, and the second and third locking dogs are operatively connected to one lever arm of the differential lever, and the servomotor is operatively connected to another lever arm of the differential lever.

6. The arrangement according to claim 1, wherein the servomotor has a linear stroke movement, an integrated restoring spring for a retracted stroke end position, and a vertical installation position relative to a stroke axis.

7. Method of controlling a servomotor in an arrangement for locking a selector mechanism of an automatically operating change-speed gearbox according to claim 1, comprising the steps of detecting a current position of the manual selector element, comparing an actual signal dependent upon current rotational output speed of the change-speed gearbox with a threshold signal, and, when the manual selector element is in the N-position or the D-position and the actual signal is smaller than the threshold signal, controllably moving the servomotor into an end position in which the locking dogs allocated to the R-position are disengaged such that the servomotor, with an auxiliary force provided by the resilient restoring device being terminated, is moved into an end position, in which the locking dogs allocated to the R-position are disengaged.

* * * * *